US012639863B2

(12) United States Patent
Zhao et al.

(10) Patent No.: US 12,639,863 B2
(45) Date of Patent: May 26, 2026

(54) GENERATING HIGH-RESOLUTION IMAGES USING SELF-ATTENTION

(71) Applicant: Google LLC, Mountain View, CA (US)

(72) Inventors: Long Zhao, Edison, NJ (US); Han Zhang, Sunnyvale, CA (US); Zizhao Zhang, San Jose, CA (US); Ting Chen, Toronto (CA)

(73) Assignee: Google LLC, Mountain View, CA (US)

( * ) Notice: Subject to any disclaimer, the term of this patent is extended or adjusted under 35 U.S.C. 154(b) by 144 days.

(21) Appl. No.: 18/564,841

(22) PCT Filed: May 27, 2022

(86) PCT No.: PCT/US2022/031467

§ 371 (c)(1),
(2) Date: Nov. 28, 2023

(87) PCT Pub. No.: WO2022/251718

PCT Pub. Date: Dec. 1, 2022

(65) Prior Publication Data

US 2024/0265586 A1      Aug. 8, 2024

Related U.S. Application Data

(60) Provisional application No. 63/194,902, filed on May 28, 2021.

(51) Int. Cl.
G06T 11/00      (2026.01)
G06T 3/4046      (2024.01)

(52) U.S. Cl.
CPC ............ G06T 11/00 (2013.01); G06T 3/4046 (2013.01)

(58) Field of Classification Search
CPC ....... G06T 11/00; G06T 3/4046; G06N 3/045; G06N 3/047; G06N 3/084
See application file for complete search history.

(56) References Cited

U.S. PATENT DOCUMENTS

2020/0410643 A1      12/2020   Kalchbrenner et al.
2022/0114702 A1*      4/2022   Liu ........................... G06T 5/70

OTHER PUBLICATIONS

Zhang et al., "Self-Attention Generative Adversarial Networks (SAGAN)," ICML 2019. (Year: 2019).*

(Continued)

*Primary Examiner* — Daniel F Hajnik
*Assistant Examiner* — Adeel Bash
(74) *Attorney, Agent, or Firm* — Fish & Richardson P.C.

(57) ABSTRACT

Methods, systems, and apparatus, including computer programs encoded on computer storage media, for generating high-resolution images using self-attention based neural networks. One of the systems includes a neural network configured to generate images, the neural network comprising a sequence of one or more first network blocks followed by a sequence of one or more second network blocks, wherein: each first network block is configured to perform operations comprising: applying a self-attention mechanism over at least a subset of first elements of a first block input to generate an updated first block input; and upsampling the updated first block input to generate a first block output; and each second network block is configured to perform operations comprising: processing a second block input using one or more neural network layers to generate an updated second block input; and upsampling the updated second block input to generate a second block output.

20 Claims, 5 Drawing Sheets

(56) References Cited

OTHER PUBLICATIONS

Brock et al., "Large Scale GAN Training for High Fidelity Natural Image Synthesis (BigGAN)," ICLR 2019. (Year: 2019).*

Xu et al., "AttnGAN: Fine-Grained Text to Image Generation with Attentional Generative Adversarial Networks," CVPR 2018. (Year: 2018).*

Wang et al., "Axial-DeepLab: Stand-Alone Axial-Attention for Panoptic Segmentation," ECCV 2020. (Year: 2020).*

Zhu et al., "DM-GAN: Dynamic Memory Generative Adversarial Networks for Text-to-Image Synthesis," CVPR 2019. (Year: 2019).*

Jiang et al., "TransGAN: Two Transformers Can Make One Strong GAN," NeurIPS 2021. (Year: 2021).*

Hudson et al., "Generative Adversarial Transformers," ICML 2021. (Year: 2021).*

Vaswani et al., "Scaling Local Self-Attention for Parameter Efficient Visual Backbones (HaloNet)," CVPR 2021. (Year: 2021).*

Yamaguchi et al., "Distributional Concavity Regularization for GANs," ICLR 2019. (Year: 2019).*

Anokhin et al., "Image generators with conditionally-independent pixel synthesis," Presented at the Proceedings of the IEEE Conference on Computer Vision and Pattern Recognition, Nashville, TN, USA, Jun. 20-25, 2021, 14278-14287.

Beltagy et al., "Longformer: The long-document transformer," CoRR, Submitted on Dec. 2020, arXiv:2004.0515, 17 pages.

Bepler et al., "Explicitly disentangling image content from translation and rotation with spatial-VAE," Advances in Neural Information Processing Systems, Dec. 2019, 15409-15419.

Brock et al., "Large scale GAN training for high fidelity natural image synthesis," Presented at the Proceedings of the International Conference on Learning Representations, New Orleans, LA, USA, May 6-9, 2019, 35 pages.

Brundage et al., "The malicious use of artificial intelligence: Forecasting, prevention and mitigation," CoRR, Submitted on Feb. 2018, arXiv:1802.07228, 101 pages.

Cao et al., "Video Super-Resolution Transformer," Presented at the Proceedings of the IEEE Conference on Computer Vision and Pattern Recognition, New Orleans, LA, USA, Jun. 19-20, 2022, 3202-3211.

Chen et al., "Cross-ViT: Cross-attention multi-scale vision transformer for image classification," Presented at the Proceedings of the IEEE Conference on Computer Vision, Montreal, QC, Canada, Oct. 10-17, 2021, 357-366.

Chen et al., "On self modulation for generative adversarial networks," Presented at the Proceedings of the International Conference on Learning Representations, Long Beach, CA, USA, Jun. 15-20, 2019, 18 pages.

Chen et al., "Self-supervised GANs via auxillary rotation loss," Presented at the Proceedings of the IEEE Conference on Computer Vision and Pattern Recognition, Long Beach, CA, USA, Jun. 16-20, 2019, 12154-12163.

Coates et al., "An analysis of single-layer networks in unsupervised feature learning," Presented at the Proceedings of the International Conference on Artifical Intelligence and Statistics, Ft. Lauderdale, FL, USA, Apr. 11-13, 2011, 215-223.

Donahue et al., "Large scale adversarial representation learning," Advances in Neural Information Processing Systems, Dec. 2019, 11 pages.

Dosovitskiy et al., "An image is worth 16x16 words: Transformers for image recognition at scale," Presented at the Proceedings of the International Conference on Learning Representation, Virtual Event, May 3-7, 2021, 22 pages.

Dupont et al., "Generative models as distributions of functions," CoRR, Submitted on Feb. 2022, arVix:2102.04776, 27 pages.

Esser et al., "Taming transformers for high-resolution image synthesis," Presented at the Proceedings of the IEEE Conference on Computer Vision and Pattern Recognition, Nashville, TN, USA, Jun. 20-25, 2021, 12873-12883.

Goodfellow et al., "Generative adversarial nets," Advances in Neural Information Processing Systems, Dec. 2014, 9 pages.

Heusel et al., "GANs trained by a two time-scale update rule converge to a local nash equilibrium," Advances in Neural Information Processing Systems, Dec. 2017, 6629-6640.

Ho et al., "Axial attention in multidimensional transformers," CoRR, Submitted on Dec. 2019, arXiv:1912.12180, 11 pages.

Ho et al., "Flow++: Improving flow-based generative models with variational dequantization and architecture design," Presented at the Proceedings of the International Conference on Machine Learning, Long Beach, CA, USA, Jun. 9-15, 2019, 9 pages.

Hoang et al., "MGAN: Training generative adversarial nets with multiple generators," Presented at the Proceedings of the International Conference on Learning Representations, Vancouver, BC, Canada, Apr. 30-May 3, 2018, 24 pages.

Huang et al., "Arbitrary style transfer in real-time with adaptive instance normalization," Presented at the Proceedings of the IEEE International Conference on Computer Vision, Venice, VN, Italy, Oct. 22-29, 2017, 1501-1510.

Huang et al., "CCNet: Criss-cross attention for semantic segmentation," Presented at the Proceedings of the IEEE International Conference on Computer Vision, Seoul, SU, South Korea, Oct. 27-Nov. 2, 2019, 603-612.

Hudson et al., "Generative adversarial transformers," Presented at the Proceedings of the International Conference on Machine Learning, Virtual Event, Jul. 18-24, 2021, 4487-4499.

International Preliminary Report on Patentability in International Appln No. PCT/US2022/031467, mailed on Dec. 7, 2023, 11 pages.

International Search Report and Written Opinion in International Appln No. PCT/US2022/031467, mailed on Oct. 5, 2022, 18 pages.

Jaegle et al., "Perceiver: General perception with iterative attention," Presented at the Proceedings of the International Conference on Machine Learning, Virtual Event, Jul. 18-24, 2021, 4651-4664.

Jiang et al., "TransGAN: Two pure transformers can make one strong GAN, and that can scale up," CoRR, Submitted on Dec. 2021, arXiv:2102.07074, 19 pages.

Jiang et al., "TransGAN: Two transformers can make one strong GAN," CoRR, Submitted on Feb. 2021, arXiv:2102.07074, 13 pages.

Johnson et al., "Perceptual losses for real-time style transfer and super-resolution," CoRR, Submitted on Mar. 2016, arVix:1603.08155, 18 pages.

Karras et al., "A style-based generator architecture for generative adversarial networks," Presented at the Proceedings of the IEEE Conference on Computer Vision and Pattern Recognition, Long Beach, CA, USA, Jun. 15-20, 2019, 4401-4410.

Karras et al., "Analyzing and improving the image quality of styleGAN," Presented at the Proceedings of the IEEE Conference on Computer Vision and Pattern Recognition, Seattle, WA, USA, Jun. 13-19, 2020, 8110-8119.

Karras et al., "Progressive growing of GANs for improved quality, stability, and variation," CoRR, Submitted on Feb. 2018, arVix:1710.10196, 26 pages.

Karras et al., "Training generative adversarial networks with limited data," Advances in Neural Information Processing Systems, Dec. 2020, 11 pages.

Kingma et al., "Adam: A method for stochastic optimization," CoRR, Submitted on Jan. 2017, arVix:1412.6980, 15 pages.

Kleineberg et al., "Adversarial generation of continuous implicit shape representations," CoRR, Submitted on Mar. 2020, arVix:2002.00349, 6 pages.

Krizhevsky et al., "Learning multiple layers of features from tiny images," University of Toronto, Apr. 2009, 60 pages.

LeCun et al., "Deep learning," Nature, May 2015, 521(7553):436-444.

Lee et al., "ViTGAN: Training GANs with vision transformers," CoRR, Submitted on Jul. 2021, arVix:2107.04589, 13 pages.

Lin et al., "COCO-GAN: Generation by parts via conditional coordinating," Presented at the Proceedings of the IEEE International Conference on Computer Vision, Seoul, SU, South Korea, Oct. 27-Nov. 2, 2019, 4512-4521.

Lin et al., "InfinityGAN: Towards infinite-resolution image synthesis," CoRR, Submitted on Oct. 2021, arXiv:2104.03963, 37 pages.

(56)        References Cited

OTHER PUBLICATIONS

Lin et al., "PacGAN: The power of two samples in generative adversarial networks," Advances in Neural Information Processing Systems, Dec. 2018, 10 pages.

Liu et al., "Deep learning face attributes in the wild," Presented at the Proceedings of the IEEE International Conference on Computer Vision, Santiago, MR, Chile, Dec. 7-13, 2015, 3730-3738.

Liu et al., "Diverse image generation via self-conducted GANs," Presented at the Proceedings of the IEEE Conference on Computer Vision and Pattern Recognition, Seattle, WA, USA, Jun. 13-19, 2020, 14286-14295.

Liu et al., "Swin transformer: Hierarchical vision transformer using shifted windows," Presented at the Proceedings of the IEEE International Conference on Computer Vision, Montreal, QC, Canada, Oct. 10-17, 2021, 10012-10022.

Menon et al., "PULSE: Self-supervised photo upsampling via latent space exploration of generative models," Presented at the Proceedings of the IEEE Conference on Computer Vision and Pattern Recognition, Seattle, WA, USA, Jun. 13-19, 2020, 2437-2445.

Mescheder et al., "Occupancy networks: Learning 3D reconstruction in function shape," Presented at the Proceedings of the IEEE Conference on Computer Vision and Pattern Recognition, Long Beach, CA, USA, Jun. 15-20, 2019, 4460-4470.

Mescheder et al., "Which training methods for GANs do actually converge?," Presented at the Proceedings of the International Conference on Machine Learning, Stockholm, SC, Sweden, Jul. 10-15, 2018, 10 pages.

Mildenhall et al., "NeRF: Representing scenes as neural radiance fields for view synthesis," Communications of the ACM, Jan. 2022, 66(1):99-106.

Park et al., "DeepSDF: Learning continuous signed distance functions for shape representation," Presented at the Proceedings of the IEEE Conference on Computer Vision and Pattern Recognition, Long Beach, CA, USA, Jun. 15-20, 2019, 165-174.

Parmar et al., "Image transformer," Presented at the Proceedings of the International Conference on Machine Learning, Stockholm, SC, Sweden, Jul. 10-15, 2018, 10 pages.

Pidhorskyi et al., "Adversarial latent autoencoders," Presented at the Proceedings of the IEEE Conference on Computer Vision and Pattern Recognition, Seattle, WA, USA, Jun. 13-19, 2020, 14104-14113.

Radford et al., "Learning transferable visual models from natural language supervision," Presented at the Proceedings of the International Conference on Machine Learning, Virtual Event, Jul. 18-24, 2021, 16 pages.

Ramesh et al., "Zero-shot text-to-image generation," Presented at the Proceedings of the International Conference on Machine Learning, Virtual Event, Jul. 18-24, 2021, 11 pages.

Razavi et al., "Generating diverse high-fidelity images with VQ-VAE-2," Advances in Neural Information Processing Systems, Dec. 2019, 11 pages.

Russakovsky et al., "ImageNet large scale visual recognition challenge," CoRR, Submitted on Jan. 2015, arVix:1409.0575, 43 pages.

Sage et al., "Logo synthesis and manipulation with clustered generative adversarial networks," Presented at the Proceedings of the IEEE Conference on Computer Vision and Pattern Recognition, Salt Lake City, UT, USA, Jun. 18-23, 2018, 5879-5888.

Salimans et al., "Improved techniques for training GANs," Advances in Neural Information Processing Systems, Dec. 2016, 9 pages.

Schonfeld et al., "A U-net based discriminator for generative adversarial networks," Presented at the Proceedings of the IEEE Conference on Computer Vision and Pattern Recognition, Seattle, WA, USA, Jun. 13-19, 2020, 8207-8216.

Shi et al., "Real-time single image and video super-resolution using an efficient sub-pixel convolutional neural network," Presented at the Proceedings of the IEEE Conference on Computer Vision and Pattern Recognition, Las Vegas, NV, USA, Jun. 27-30, 2016, 1874-1883.

Skorokhodov et al., "Adversarial generation of continuous images," Presented at the Proceedings of the IEEE Conference on Computer Vision and Pattern Recognition, Nashville, TN, USA, Jun. 20-25, 2021, 10753-10764.

Steed et al., "Image representations learned with unsupervised pre-training contain human-like biases," Presented at the Proceedings of the ACM Conference on Fairness, Accountability, and Transparency, Virtual Event, Mar. 3-10, 2021, 701-713.

Szegedy et al., "Rethinking the inception architecture for computer vision," Presented at the Proceedings of the IEEE Confernce on Computer Vision and Pattern Recognition, Las Vegas, NV, USA, Jun. 27-30, 2016, 2818-2826.

Tian et al., "CR-GAN: Learning complete representations for multi-view generation," CoRR, Submitted on Jun. 2018, arVix:1806.11191, 7 pages.

Tolstikhin et al., "MLP-Mixer: An all-MLP architecture for vision," Advances in Neural Information Processing Systems, Dec. 2021, 12 pages.

Touvron et al., "ResMLP: Feedforward networks for image classification with data- efficienct training," CoRR, Submitted on Jun. 2021, arVix:2105.03404, 18 pages.

Touvron et al., "Training data-efficient image transformers and distillation through attention," Presented at the Proceedings of the International Conference on Machine Learning, Virtual Event, Jul. 18-24, 2021, 11 pages.

Van Den Oord et al., "Conditional image generation with PixelCNN decoders," Advances in Neural Information Processing Systems, Dec. 2016, 9 pages.

Van Den Oord et al., "Neural discrete representation learning," Advances in Neural Information Processing Systems, Dec. 2017, 10 pages.

Vaswani et al., "Attention is all you need," Advances in Neural Information Processing Systems, Dec. 2017, 11 pages.

Vaswani et al., "Scaling local self-attention for parameter efficient visual backbones," Presented at the Proceedings of the IEEE Conference on Computer Vision and Pattern Recognition, Nashville, TN, USA, Jun. 20-25, 2021, 12894-12904.

Wang et al., "Axial-DeepLab: Stand-alone axial attention for panoptic segmentation," CoRR, Submitted on Aug. 2020, arVix:2003.07853, 26 pages.

Wang et al., "MaX-DeepLab: End-to-end panoptic segmentation with mask transformers," Presented at the Proceedings of the IEEE Conference on Computer Vision and Pattern Recognition, Nashville, TN, USA, Jun. 20-25, 2021, 5463-5474.

Wang et al., "Non-local neural networks," Presented at the Proceedings of the IEEE Conference on Computer Vision and Pattern Recognition, Salt Lake City, UT, USA, Jun. 18-23, 2018, 7794-7803.

Westerlund, "The emergence of deepfake technology: A review," Technology Innovation Management Review, Nov. 2019, 9(11):39-52.

Xiao et al., "VAEBM: A symbiosis between variational autoencoders and energy-based models," CoRR, Submitted on Nov. 2021, arVix:2010.00654, 33 pages.

Zhang et al., "Aggregating nested transformers," CoRR, Submitted on Jun. 2021, arVix:2105.12723, 18 pages.

Zhang et al., "Consistency regularization for generative adversarial networks," CoRR, Submitted on Feb. 2020, arVix:1910.12027, 19 pages.

Zhang et al., "Cross-modal contrastive learning for text-to-image generation," Presented at the Proceedings of the IEEE Conference on Computer Vision and Pattern Recognition, Nashville, TN, USA, Jun. 20-25, 2021, 833-84.

Zhang et al., "Self-attention generative adversarial networks," Presented at the Proceedings of the International Conference on Machine Learning, Long Beach, CA, USA, Jun. 9-15, 2019, 10 pages.

Zhang et al., "StackGAN: Text to photo-realistic image synthesis with stacked generative adversarial networks," Presented at the Proceedings of the IEEE International Conference on Computer Vision, Venice, VN, Italy, Oct. 22-29, 2017, 5907-5915.

Zhao et al., "Differentiable augmentation for data-efficient GAN training," Advances in Neural Information Processing Systems, Dec. 2020, 12 pages.

(56) References Cited

OTHER PUBLICATIONS

Zhao et al., "Improved consistency regularization for GANs," Presented at the Proceedings of the AAAI Conference on Artificial Intelligence, Virtual Event, Feb. 2-9, 2021, 11033-11041.

Zhao et al., "Learning to forecase and refine residual motion for image-to-video generation," Presented at the Proceedings of the European Conference on Computer Vision, Munich, BY, Germany, Sep. 8-14, 2018, 17 pages.

Zhao et al., "Towards image-to-video translation: A structure-aware approach via multi-stage generative adversarial networks," International Journal of Computer Vision, Apr. 2020, 128(10):2514-2533.

Zhu et al., "In-domain GAN inversion for real image editing," CoRR, Submitted on Jul. 2020, arVix:2004.00049, 31 pages.

Zhu et al., "Unpaired image-to-image translation using cycle-consistent adversarial networks," Presented at the Proceedings of the IEEE International Conference on Computer Vision, Venice, VN, Italy, Oct. 22-29, 2017, 2223-2232.

* cited by examiner

400

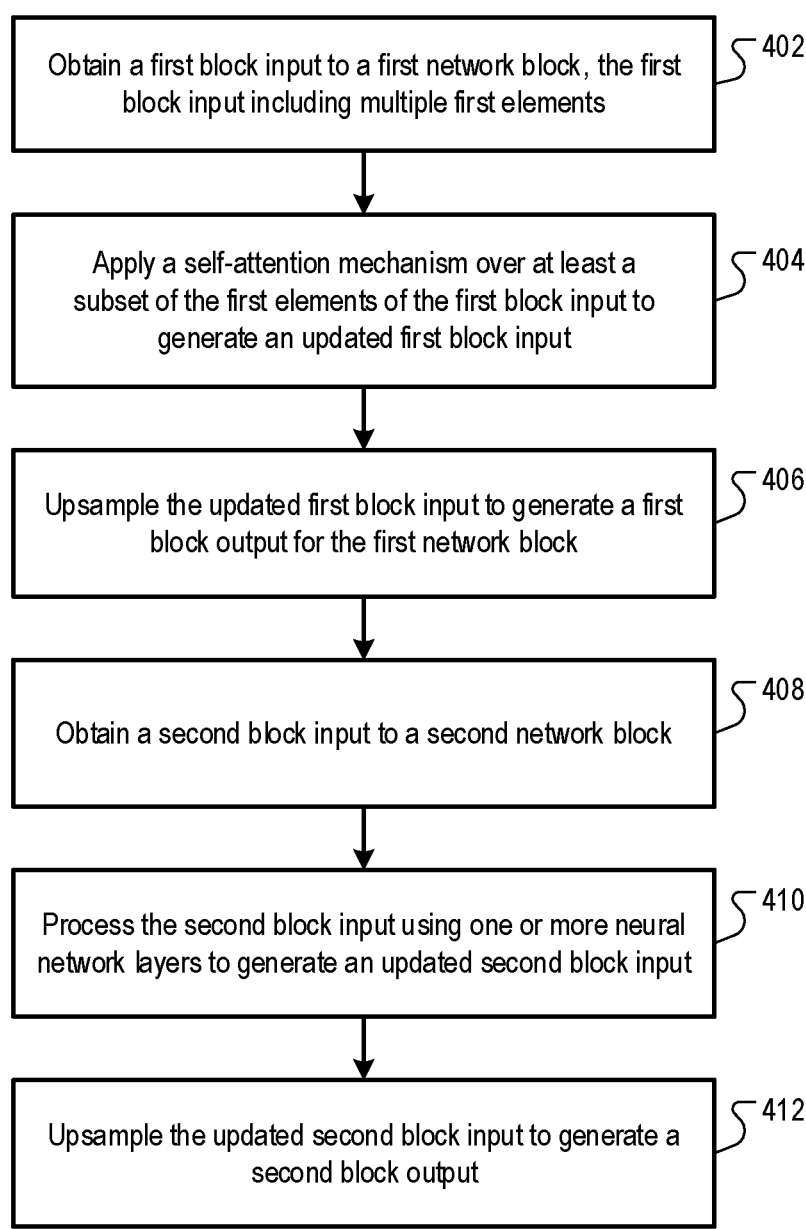

Obtain a first block input to a first network block, the first block input including multiple first elements ⟍402

Apply a self-attention mechanism over at least a subset of the first elements of the first block input to generate an updated first block input ⟍404

Upsample the updated first block input to generate a first block output for the first network block ⟍406

Obtain a second block input to a second network block ⟍408

Process the second block input using one or more neural network layers to generate an updated second block input ⟍410

Upsample the updated second block input to generate a second block output ⟍412

FIG. 4

GENERATING HIGH-RESOLUTION IMAGES USING SELF-ATTENTION

CROSS-REFERENCE TO RELATED APPLICATIONS

This application is a National Stage Application under 35 U.S.C. § 371 and claims the benefit of International Application No. PCT/US2022/031467, filed May 27, 2022, which claims the benefit of priority to U.S. Provisional Application Ser. No. 63/194,902, filed May 28, 2021, the entirety of which is incorporated herein by reference.

BACKGROUND

This specification relates to generating images using neural networks.

Neural networks are machine learning models that employ one or more layers of nonlinear units to predict an output for a received input. Some neural networks include one or more hidden layers in addition to an output layer. The output of each hidden layer is used as input to the next layer in the network, i.e., the next hidden layer or the output layer. Each layer of the network generates an output from a received input in accordance with current values of a respective set of parameters.

SUMMARY

This specification describes a system implemented as computer programs on one or more computers in one or more locations that is configured to generate high-resolution synthetic images using a self-attention based neural network. The self-attention based neural network can be configured to process a network input using a sequence of network blocks.

In some implementations, the self-attention based neural network only processes a randomly-sampled latent code to generate the synthetic image; that is, the generation of the synthetic image can be "unconditioned." In some other implementations, instead of or in addition to processing a randomly-sampled latent code, the self-attention based neural network can condition the generation of the synthetic image, e.g., by processing a network input representing desired characteristics of the synthetic image, and/or by processing an input image on which the synthetic image is to be conditioned (e.g., an input image that has a desired style or content that the synthetic image is to emulate).

Each network block can be configured to process a block input representing an intermediate representation of the network input (or, equivalently, representing a "partial" representation of the synthetic image, referred to as such because later network blocks in the sequence have not yet encoded additional information that will be included in the synthetic image) to generate a block output representing an updated representation of the network input (or, equivalently, an updated partial representation of the synthetic image). For example, each block input can be a block input sequence (or a two-dimensional or three-dimensional block input tensor) that includes multiple elements that each represent a respective patch of the synthetic image. Each network block can consecutively update the representations of the patches (e.g., including upsampling the representations to consecutively higher resolutions), so that the block output of the final network block in the sequence of network blocks is a sequence (or two-dimensional or three-dimensional tensor) of elements that each represents the final pixel values of a respective patch of the synthetic image. The elements of the final block output can then be composed (i.e., "stitched together") to generate the output synthetic image.

One or more of the network blocks can each perform self-attention on the elements of the respective block input. For example, the sequence of network blocks can include a sequence of one or more "low-resolution" network blocks followed by a sequence of one or more "high-resolution" network blocks, referred to as such because network blocks earlier in the sequence of network blocks generally process block inputs that have a lower resolution (i.e., dimensionality) than network blocks later in the sequence of network blocks. Each low-resolution network block can perform self-attention on the elements of their respective block inputs, while each high-resolution network block can be configured not to perform self-attention on the elements of their respective block inputs. Only performing self-attention at earlier stages of the generation of the synthetic image, when the partial representation of the synthetic image has a relatively low dimensionality, can improve the time and computational efficiency of the self-attention based neural network because the computational cost of performing self-attention increases quadratically with the number of elements that are being attended to.

One or more of the network blocks can each perform multi-axis self-attention, where instead of applying self-attention over all elements of the block input (or an updated representation thereof) at once, the network block applies, for each dimension of one or more different dimensions of the block input, a self-attention mechanism over elements that are aligned in the dimension.

The subject matter described in this specification can be implemented in particular embodiments so as to realize one or more of the following advantages.

Using techniques described in this specification, a system can generate high-resolution images using a self-attention-based neural network. Many existing systems that use self-attention to generate synthetic images are limited to generating relatively low-resolution images because of the computational cost of applying self-attention across a large number of pixels. Namely, the computational cost of applying standard self-attention to a representation of an image increases quadratically as the number of elements in the representation increases, which can be prohibitively computationally expensive in many existing systems.

As a particular example, some existing systems that use self-attention can only generate images up to a resolution of 32×32 pixels. Using techniques described in this specification, a system can execute a self-attention based neural network to generate images having resolutions of, e.g., 128×128 pixels, 256×256 pixels, 1024×1024 pixels, 720p (e.g., 1280×720 pixels), 1080p (e.g., 1920×1080 pixels), or 4K (e.g., 3840×2160 pixels). Furthermore, the high-resolution synthetic images generated using techniques described in this specification can be highly realistic, e.g., can be comparable, or even indistinguishable, from "real" images captured from the real world.

Using some techniques described in this specification, a system can leverage multi-axis self-attention to overcome the computational cost of applying self-attention in high-resolution images. Multi-axis self-attention reduces the amount of time and quantity of computations required to apply self-attention across an image, while maintaining a comparable performance. In some implementations, the operations of multi-axis self-attention can be parallelized (e.g., as described below; the respective self-attention operations for each of multiple axes can be assigned to respective computing nodes, e.g., respective devices or respective threads or cores of a device), further improving the time and computational efficiency of the neural network. In particular, multi-axis self-attention can be implemented on parallel processing devices, e.g., special purpose hardware such as tensor processing units (TPUs), for efficient execution at training and/or inference time.

Using some techniques described in this specification, a system can further improve the efficiency of the neural network by only applying self-attention in a first phase of the generation, and not applying self-attention in a later, second phase of the generation. The earlier first phase can process lower-dimensional partial representations of the synthetic image to encode both local and global information into the block inputs for the later second phase, allowing the neural network to avoid the costly self-attention when processing larger partial representations in the second phase. In some implementations, the operations of the second phase can also be parallelized; for example, the second phase can include element-wise feedforward neural network layers such that the processing of respective elements can be performed in parallel across multiple devices or multiple threads/cores of a device, further improving the efficiency of the neural network.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

FIG. 4 is a flow diagram of an example process for generating a synthetic image.

Like reference numbers and designations in the various drawings indicate like elements.

DETAILED DESCRIPTION

This specification describes a system implemented as computer programs on one or more computers in one or more locations that is configured to generate synthetic images using a self-attention based neural network.

Figure 1:
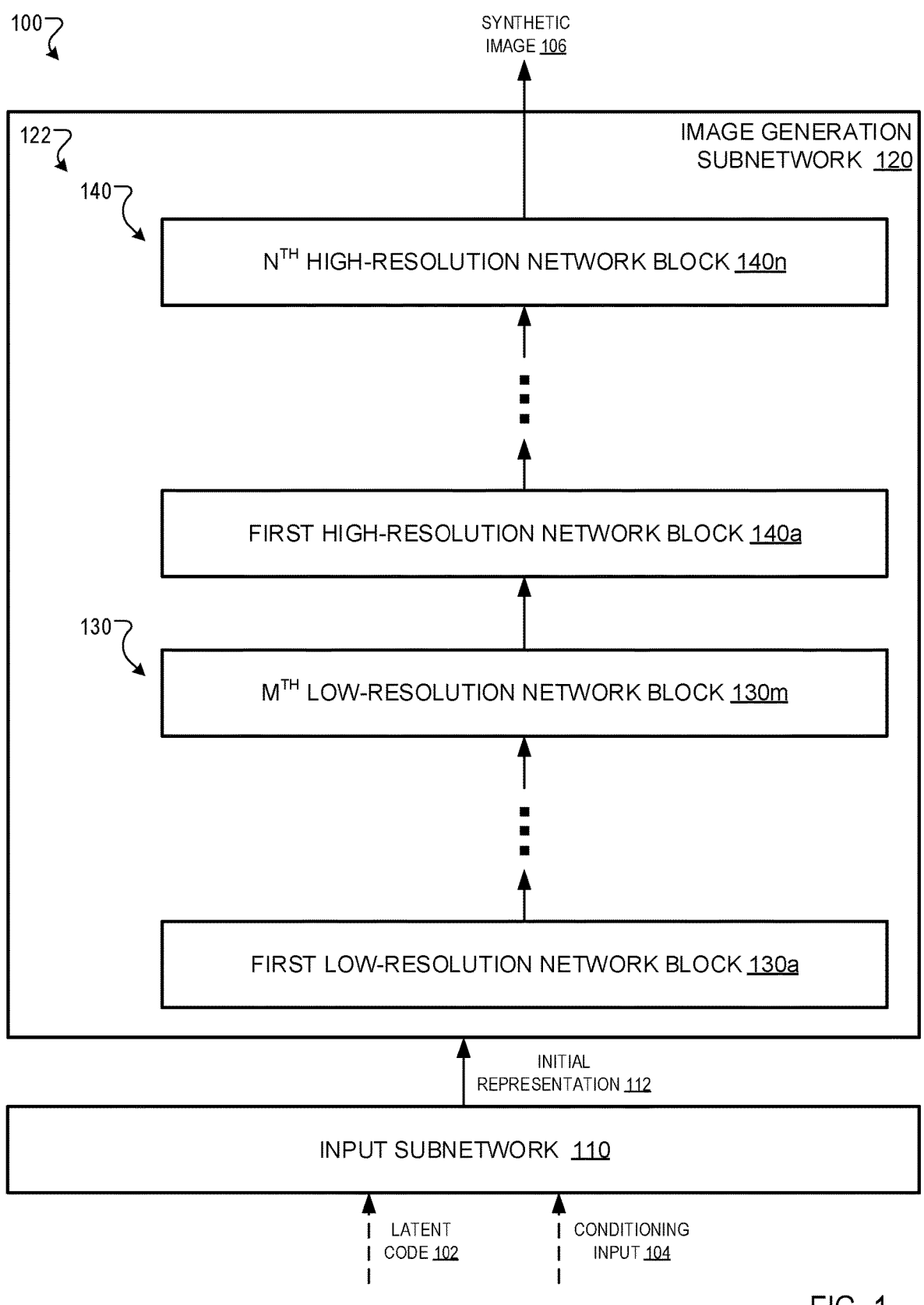
FIG. 1 is a diagram of an example neural network that is configured to generate synthetic images.

FIG. 1 is a diagram of an example neural network 100 that is configured to generate synthetic images 106. The neural network 100 is an example of a system implemented as computer programs on one or more computers in one or more locations, in which the systems, components, and techniques described below can be implemented.

The neural network 100 includes an input subnetwork 110 and an image generation subnetwork 120.

The input subnetwork 110 is configured to generate an initial representation 112 of the synthetic image 106. The image generation subnetwork 120 is configured to process the initial representation using a sequence 122 of network blocks to generate the synthetic image 106.

The network blocks in the sequence 122 can each update the initial representation 112 of the synthetic image 106. In particular, the first network block in the sequence 122 of network blocks can be configured to process a block input that includes the initial representation 112 and to generate a block output that is an updated representation of the synthetic image 106. Each subsequent network block in the sequence 122 can then process the block output of the previous network block in the sequence 122 to further update the representation of the synthetic image 106. That is, the block input for the $(i+1)^{th}$ network block in the sequence 122 can be the block output of the $i^{th}$ network block in the sequence 122. The block output of the final network block in the sequence 122 can represent a final representation of the synthetic image 106, e.g., can include the final pixel values for each pixel in the synthetic image 106.

Each representation of the synthetic image 106 generated by the neural network 100 before the final representation can be called a "partial" representation of the synthetic image 106, because subsequent network blocks in the sequence 122 have not yet encoded additional information that will be included in the final representation of the synthetic image 106. That is, each partial representation only includes a portion of the information that will eventually be encoded in the final representation of the synthetic image 106.

In some implementations, the neural network 100 includes one or more neural network layers preceding the first network block in the sequence 122, e.g., one or more element-wise feedforward neural network layers, that are configured to process the initial representation 112 to generate the block input for the first network block in the sequence 122. In some implementations, the neural network 100 includes one or more neural network layers following the final network block in the sequence 122, e.g., one or more element-wise feedforward neural network layers, that are configured to process the block output of the final network block in the sequence 122 to generate the synthetic image 106.

The initial representation 112 of the synthetic image 106 can include multiple elements that are each an initial representation of a respective "patch" of the synthetic image 106. In this specification, a patch of an image is a strict subset of the pixels of the image, e.g., a contiguous subset of the pixels. Thus, each element in the initial representation 112 can correspond to a respective spatial region of the synthetic image 106.

Generally, each element in the initial representation 112 can be an n-dimensional tensor of values; for example, each element in the initial representation 112 can be a one-dimensional vector of values.

Because the elements of the initial representation 112 can represent respective patches of the synthetic image 106, the elements can implicitly or explicitly have a spatial relationship with each other.

For example, the initial representation 112 can be a sequence of elements each corresponding to a respective patch of the synthetic image 106, where the ordering of the elements in the sequence encodes the spatial relationships between the elements (e.g., if the synthetic image 106 is a two-dimensional image, then the first element in the sequence can represent the "top-right" patch of the image 106, the second element in the sequence can represent the patch directly to the right of the patch represented by the first element, and so on).

As another example, the initial representation 112 can be a two-dimensional tensor of elements that explicitly encodes the spatial relationships between the patches of the synthetic image 106 represented by the elements (that is, the spatial relationship between the elements is the same as the spatial relationship between the respective corresponding patches). As another example, the initial representation 112 can be a three-dimensional tensor of elements, e.g., if the synthetic image 106 is a three-dimensional point cloud.

Each network block in the sequence 122 can update the representation of the synthetic image 106 by processing the respective elements of the block input to generate updated elements for the block output, where each updated element in the block output represents a respective patch of the synthetic image 106. For example, if the initial representation 112 includes a set of elements that are one-dimensional vectors (e.g., organized as a sequence of one-dimensional vectors or a two-dimensional matrix where each element of the matrix is a one-dimensional vector), then the respective block output of each network block in the sequence 122 can also include a set of elements that are one-dimensional vectors.

One or more of the network blocks in the sequence 122 can increase the resolution of the current partial representation of the synthetic image 106, i.e., can generate a block output that includes more elements than the block input. That is, a network block can increase the size of the partial representation of the synthetic image 106 in size in at least one dimension.

For example, if each partial representation of the synthetic image 106 is a sequence of elements, then a network block can generate block output sequence with more elements than the block input sequence. As a particular example, if each element in the sequence of each partial representation is a one-dimensional vector, then one or more network blocks in the sequence 122 can increase the number of elements in the sequence while reducing the length of each vector (e.g., until the vectors of the block output of the final network block in the sequence 122 each include three values representing a pixel value, e.g., RGB value, of a respective pixel).

As another example, if each partial representation is a two-dimensional matrix of elements, then a network block can process an $n_1 \times m_1$ block input matrix to generate an $n_2 \times m_2$ block output matrix, where $n_2 > n_1$ and/or $m_2 > m_1$. As a particular example, if each element in the matrix of each partial representation is a one-dimensional vector (i.e., if each element has more than one "channel"), then one or more network blocks in the sequence 122 can increase the dimensionality of the matrix in a length dimension and a width dimension while keeping the number of channels constant, or reducing the number of channels (e.g., until the elements of the block output of the final network block in the sequence 122 each include three values representing a pixel value, e.g., RGB value, of a respective pixel).

For example, a network block can process the block input to generate an updated block input, then upsample the updated block input, as described in more detail below.

For blocks that increase the resolution of the partial representation of the synthetic image 106, each particular element in the generated block output can also represent a respective patch of the synthetic image 106, e.g., a sub-patch of the patch represented by the element of the block input that was upsampled to generate the particular element in the block output. That is, each output element in the block output can be considered to correspond to a particular input element of the block input (even if the network block includes convolutional and/or self-attention neural network layers that cause the value of each output element to be influenced by multiple input elements), and the patch represented by the output element can include a strict subset of the pixels of the patch represented by the corresponding input element.

In some implementations, each of the network blocks in the sequence 122 increases the resolution of the partial representation of the synthetic image 106, e.g., by a same amount at each network block. In some other implementations, only some of the network blocks (e.g., every second network block) in the sequence 122 increase the resolution of the partial representation of the synthetic image 106.

The input subnetwork 110 can be configured to generate the initial representation 112 by processing a latent code 102. The latent code 102 can be a tensor or a sequence of tensors that has been randomly sampled from a predetermined distribution, e.g., a Normal distribution. That is, is some implementations, the latent code 102 is a single tensor (e.g., a one-dimensional vector), while in some other implementations the latent code 102 is a sequence of multiple tensors (e.g., a sequence of multiple one-dimensional vectors). The latent code 102 can also be called a "random seed," and can be used to vary the content and/or style of the synthetic images 106 generated by the neural network 100 at respective different executions. For example, the input subnetwork 110 can perform a linear projection of the latent code 102 to generate the initial representation 112.

In other words, the neural network 100 can be configured to generate synthetic images 106 that are "unconditioned." The neural network 100 can be trained to generate unconditioned synthetic images 106 that appear to be drawn (i.e., sampled) from a distribution defined by a set of training images used to train the neural network 100.

In some other implementations, the neural network 100 can be configured to generate synthetic images 106 that are conditioned. That is, instead of or in addition to processing the latent code 102, the input subnetwork 110 can process a conditioning input 104 to generate the initial representation 112. The conditioning input 104 can represent one or more desired characteristics of the synthetic image 106; the input subnetwork 110 can thus generate an initial representation 112 that encodes the desired characteristics so that the final synthetic image 106 depicts the desired characteristics. For example, the conditioning input 104 can identify one or more classes to which the synthetic image 106 is to belong. As a particular example, the conditioning input 104 can identify one or more classes of objects (e.g., dog, cat, person, and the like) that are to be depicted in the synthetic image 106. As another particular example, the conditioning input 104 can identify one or more global image classes (e.g., whether the image 106 depicts a scene in the day or at night, or whether the image 106 depicts a scene in the summer or the winter) that are to be depicted in the synthetic image 106.

As another example, the conditioning input 104 can include a text input specifying a desired content and/or style of the synthetic image 106, and the input subnetwork 110 can be configured to process the text input to generate an initial representation 112 that encodes the desired content and/or style.

As another example, the conditioning input 104 can include an input image that has a style and/or content that the synthetic image 106 is to emulate, and the input subnetwork 110 can be configured to process the input image to generate an initial representation 112 that encodes the desired content and/or style. In this specification, processing an image refers to processing the intensity values of the pixels of the image.

As a particular example, the input image can be a lower-resolution version of the synthetic image 106, and the neural network 100 can be configured to perform super-resolution, i.e., to generate a higher-resolution image 106 corresponding to the lower-resolution input image. The lower-resolution input image can be an image captured of the real world, can be generated from a computer model using a graphics rendering system, or can be generated by another machine learning system (either trained jointly with the neural network 100 or separately from the neural network 100) based on some other conditioning input, e.g., a text input specifying the desired content of the lower-resolution input image. In some such implementations, instead of generating the initial representation 112 using the input subnetwork 110, the elements of the initial representation 112 can each be a respective image patch of the input image.

In implementations in which the initial representation 112 is not generated from a conditioning input 104 (e.g., in implementations in which the initial representation 112 is only generated from the latent code 102), the generation of the synthetic image 106 is called "unconditioned." In implementations in which the initial representation is generated from a conditioning input 104, the generation of the synthetic image 106 is called "conditioned."

In some other implementations, the initial representation 112 is provided to the neural network 100 by an external system.

The network blocks in the sequence 122 can each include one or more neural network layers of any appropriate type. For example, at least one of the network blocks can include one or more element-wise feedforward neural network layers that are configured to process each element of the current partial representation of the synthetic image 106 to update the element. Instead or in addition, at least one of the network blocks can include one or more convolutional neural network layers that are configured to apply a convolutional kernel to the elements of the current partial representation of the synthetic image 106. As a particular example, if the current partial representation is a two-dimensional or three-dimensional tensor of elements representing respective patches of the synthetic image 106, wherein the tensor encodes the spatial relationships between the patches represented by the elements, then the network block can apply two-dimensional convolution to the tensor to generate an updated tensor that encodes dependencies between respective spatial regions of the synthetic image 106. Instead or in addition, at least one of the network blocks can include one or more self-attention neural network layers, e.g., multi-axis self-attention neural network layers, as described in more detail below.

The sequence 122 of network blocks of the image generation subnetwork 120 can include a first sequence 130 of M low-resolution network blocks 130a-m. M≥1, followed by a second sequence 140 of N high-resolution network blocks 140a-n, N≥1. The low-resolution network blocks 130a-m are sometimes called "first" network blocks, and the high-resolution network blocks 140a-n are sometimes called "second" network blocks.

At least some of the low-resolution network blocks 130a-m can be configured to apply self-attention to the elements of the respective block inputs, while the high-resolution network blocks 140a-n can be configured not to apply self-attention to the elements of the respective block inputs. For example, each of the low-resolution network blocks 130a-m can be configured to apply self-attention to the elements of the respective block inputs, or every second low-resolution network block 130a-m can be configured to apply self-attention to the elements of the respective block inputs.

The network blocks 130a-m are referred to as "low-resolution" and the network blocks 140a-n are referred to as "high-resolution" because, as described above the resolution of the partial representation of the synthetic image 106 can increase as the partial representation is updated by the network blocks. Thus, network blocks earlier in the sequence 122 (e.g., the network blocks in the first sequence 130) generally process block inputs that have a lower resolution (i.e., dimensionality) than network blocks later in the sequence 122 (e.g., the network blocks in the second sequence 140). Identifying a network block as a "low-resolution" or "high-resolution" is intended only to conveniently distinguish respective network blocks (e.g., to distinguish a sequence of network blocks that performs self-attention from a sequence of network blocks that does not perform self-attention), and should not be interpreted as limiting the nature of the operations that can be performed by the network block or otherwise implicitly characterizing the network block.

Only performing self-attention during the first sequence 130 of low-resolution network blocks 130a-m, when the partial representation of the synthetic image 106 has a relatively low dimensionality, while avoiding performing self-attention during the second sequence 130 of high-resolution network blocks 140a-n, when the partial representation of the synthetic image 106 has a relatively high dimensionality, can significantly improve the time and computational efficiency of the based neural network 100.

In some implementations, some or all of the low-resolution network blocks 130a-m apply multi-axis self-attention to their respective block inputs. Under multi-axis self-attention, the self-attention mechanism is not applied over all elements of the block input at once. Rather, for each dimension of one or more different dimensions of the block input, the self-attention mechanism is applied over elements that are aligned in the dimension, i.e., that occupy the same index in the dimension. For example, when applying multi-axis self-attention to a tensor of dimensionality $M \times N$, a system can perform M self-attention procedures over elements of the tensor that have the same index of the M indices in the first dimension (i.e., that are "aligned" in the first dimension), and/or N self-attention procedures over elements of the tensor that have the same index of the N indices in the second dimension. This procedure would have a computational complexity of $O(M \cdot N)$, as opposed to standard self-attention which has a computational complexity of $O(M^2 \cdot N^2)$, thus significantly reducing the computational cost of performing self-attention.

Multi-axis self-attention is described in more detail below with reference to FIG. 3.

In some implementations in which the initial representation 112 is generated from a latent code 102, instead of or in addition to applying a self-attention mechanism, some or all of the network blocks in the sequence 122 each apply a cross-attention mechanism between (i) the block input of the network block and (ii) an embedding of the latent code 102. For example, the embedding of the latent code 102 can be the initial representation 112 generated by the input subnetwork 110; that is, the network block can apply cross-attention between the block input to the network block and the network input to the image generation subnetwork 120.

As another example, the neural network 100 can process the latent code 102 using one or more neural network layers (e.g., one or more feedforward neural network layers) that are different from the input subnetwork 110 to generate the embedding of the latent code 102. For example, the embedding of the latent code 102 can be a sequence of tensors. As a particular example, if the latent code 102 is a sequence of tensors, then the neural network 100 can process the latent code 102 using one or more element-wise feedforward neural network layers to generate the embedding of the latent code 102. As another particular example, if the latent code 102 is a single one-dimensional vector, then the neural network 100 can process the latent code 102 using a feed-forward neural network layer to generate an output vector that is larger (i.e., has more elements) than the latent code 102; the neural network 100 can then generate the embedding of the latent code 102 by reshaping the output vector to generate a sequence of one-dimensional vectors that represents the embedding, e.g., by determining the first vector in the sequence to include the first n elements of the output vector, the second vector in the sequence to include the next n elements of the output vector, and so on.

In some implementations in which multiple different network blocks in the sequence 122 perform cross-attention using an embedding of the latent code 102, the embedding is the same for each network block; in some other implementations, the embedding is different for each network block, e.g., is generated by a different sequence of one or more neural network layers.

In some such implementations, the neural network 100 can append a positional embedding to each element of the embedding of the latent code 102 before performing cross-attention, where the positional embedding identifies a position of the element within the embedding of the latent code 102. For example, the positional embedding can be machine-learned, e.g., learned concurrently with the training of the neural network 100. In implementations in which the embedding of the latent code 102 is processed using cross-attention mechanisms of the neural network 100, incorporating positional information into the embedding of the latent code 102 can allow the neural network 100 to generate cohesive synthetic images 106, e.g., allows the neural network 100 to generate realistic textures in respective locations of the synthetic image 106.

In this specification, an embedding is an ordered collection of numeric values that represents an input in a particular embedding space. For example, an embedding can be a vector of floating point or other numeric values that has a fixed dimensionality.

In some implementations in which the initial representation 112 is generated from a conditioning input 104, instead of or in addition to applying a self-attention mechanism, some or all of the network blocks in the sequence 122 each apply a cross-attention mechanism between (i) the block input of the network block and (ii) the conditioning input 104 or an embedding of the conditioning input 104. For example, the embedding of the conditioning input 104 can be the initial representation 112 generated by the input subnetwork 110, or an embedding generated by the neural network 100 using one or more neural network layers (e.g., one or more feedforward neural network layers) that are different from the input subnetwork 110.

In some such implementations, the neural network 100 can append a positional embedding to each element of the embedding of the conditioning input 104 before performing cross-attention, where the positional embedding identifies a position of the element within the embedding of the conditioning input 104. For example, the positional embedding can be machine-learned, e.g., learned concurrently with the training of the neural network 100.

For example, each network block in the sequence 122 can apply a cross-attention mechanism. As another example, every second network block in the sequence 122 can apply a cross-attention mechanism. As another example, only the low-resolution network blocks 130*a-m* in the first sequence 130 can apply a cross-attention mechanism. As another example, only the high-resolution network blocks 140*a-n* in the second sequence 140 can apply a cross-attention mechanism.

An example low-resolution network block is described below with reference to FIG. 2A. An example high-resolution network block is described below with reference to FIG. 2B.

The neural network 100 can be trained using any appropriate technique.

For example, a training system can train the neural network 100 using a generative adversarial network (GAN) framework. That is, the training system can train the neural network 100 in an adversarial manner using a group of one or more discriminators. Each of the discriminators can be configured to process an image (e.g., a synthetic image 106 generated by the neural network 100 or a real image captured from the real world) and generate a prediction of whether the image is real or synthetic. The training system can then update the network parameters of the neural network 100 (and, optionally, the one or more discriminators) based on an error of the prediction, e.g., using back-propagation and gradient descent. The training system can generate an update to the network parameters of the neural network 100 to cause the neural network 100 to generate synthetic images 106 that the one or more discriminators incorrectly predict to be real.

As a particular example, the training system can determine an update to the network parameters of the neural network 100 using the logistic GAN loss:

$$\log(1-D(G(z)))$$

where $G(z)$ is synthetic image generated by the neural network 100, and $D(G(z))$ is the likelihood assigned by the discriminator networks that the synthetic image is real.

As another particular example, the training system can determine an update to the network parameters of the neural network 100 using a saturated version of the logistic GAN loss:

$$-\log(D(G(z)))$$

In some implementations, the training system can add a gradient penalty, e.g., an $R_1$ gradient penalty, to encourage convergence.

As another example, a training system can train the neural network 100 using a variational autoencoder (VAE) framework. That is, the training system can train the neural network 100 as the decoder neural network of a variational autoencoder that includes (i) an encoder neural network that is configured to process a network input to generate an embedding of the network input and (ii) a decoder neural network that is configured to process the embedding of the network input to generate a network output that is a predicted reconstruction of the network input. Thus, if the network input represents an image and the network output represents a reconstructed version of the image, then the decoder neural network is configured to process an input representation of an image in a latent space (e.g., the latent code 102 that has been sampled from a particular latent space), and to generate a synthetic image (e.g., the synthetic image 106) from the input representation. To train the encoder and decoder neural networks, the training system can determine a difference between the network input and the network output, and backpropagate the determined difference through the decoder neural network and the encoder neural network to generate a parameter update for the respective networks, e.g., using gradient descent.

As another example, a training system can train the neural network 100 using an autoregressive model that models the synthetic image 106 as a sequence of pixels and represents the probability of the synthetic image 106 as sampled from a particular distribution of synthetic images as a product of the conditional probabilities of the pixels in the sequence. For instance, the training system can train the neural network 100 as described in "Conditional Image Generation with PixelCNN Decoders," van den Oord et al., arXiv: 1606.05328.

As another example, a training system can train the neural network 100 using a flow-based generative model, e.g., as described in "Flow++: Improving Flow-Based Generative Models with Variational Dequantization and Architecture Design," Ho et al., arXiv: 1902.00275.

In implementations in which the neural network 100 is configured to perform super-resolution to increase the resolution of an input image, as described above, a training system can train the neural network 100 in a supervised manner using training examples that include (i) low-resolution input images and (ii) ground-truth high-resolution versions of the input images. For example, the training examples can be generated by downsampling ground-truth high-resolution images.

The neural network 100 can be configured to generate synthetic images of any appropriate type. For example, the synthetic image 102 can be a two-dimensional image, e.g., a two-dimensional image that has multiple channels (e.g., an RGB image). As another example, the synthetic image 102 can be a hyperspectral image that represents a continuous spectrum of wavelengths, e.g., by identifying, for each pixel in the image 102, a distribution over the spectrum. As another example, the synthetic image 102 can be a point cloud that includes multiple points, where each point has a respective coordinate, e.g., in a three-dimensional or a higher-dimensional coordinate space; as a particular example, the image 102 can be a point cloud generated by a LIDAR sensor. As another example, the synthetic image 102 can be a medical image generating by a medical imaging device; as particular examples, the image 102 can be a computer tomography (CT) image, a magnetic resonance imaging (MRI) image, an ultrasound image, an X-ray image, a mammogram image, a fluoroscopy image, or a positron-emission tomography (PET) image.

Figure 2A:
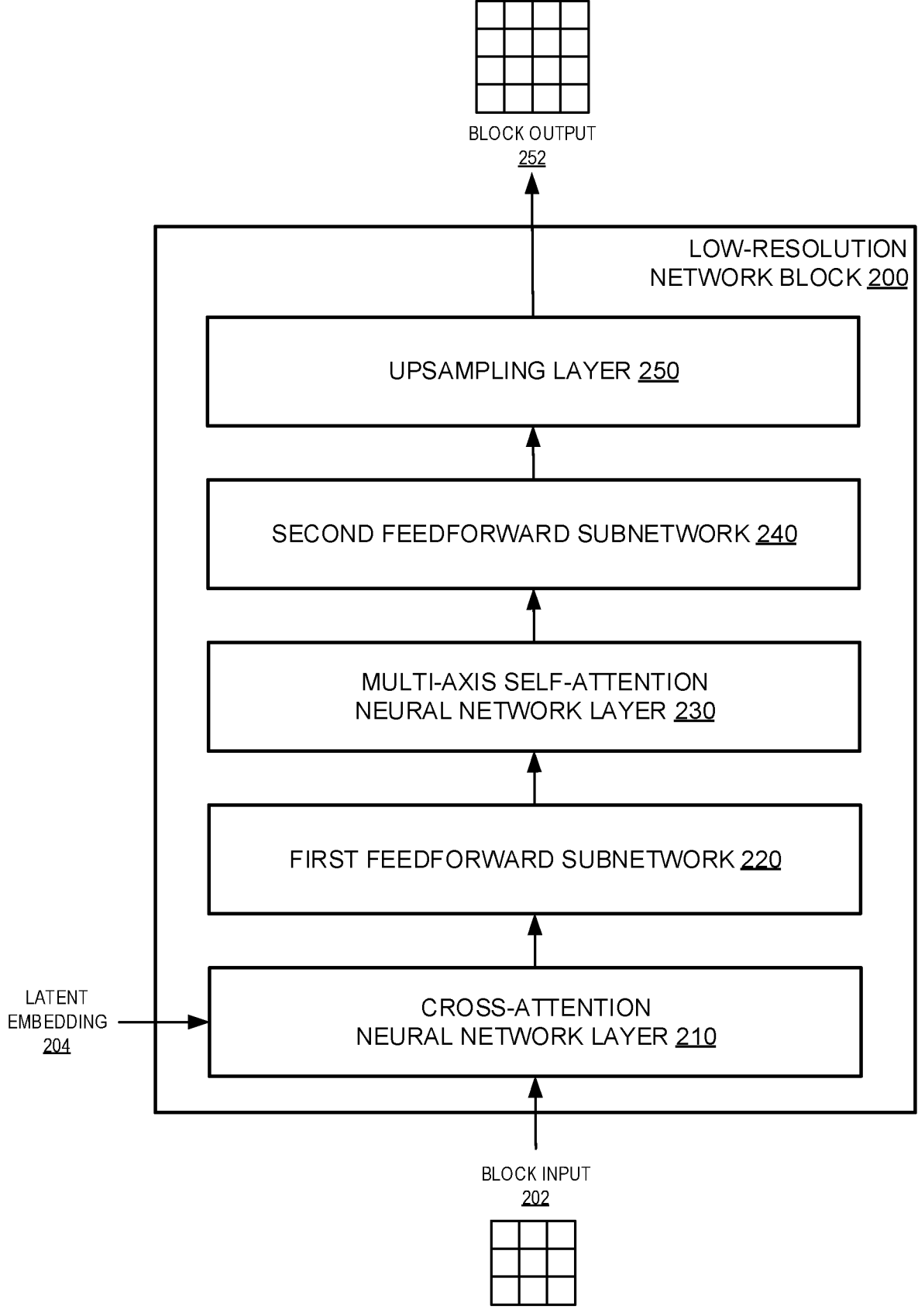
FIG. 2A is a diagram of an example low-resolution network block.

FIG. 2A is a diagram of an example low-resolution network block 200. The low-resolution network block 200 is an example of a system implemented as computer programs on one or more computers in one or more locations, in which the systems, components, and techniques described below can be implemented.

The low-resolution network block 200 can be one of a sequence of network blocks of a neural network configured to generate synthetic images. For example, the low-resolution network block 200 can be a component of the neural network 100 described above with reference to FIG. 1.

The low-resolution network block 200 is configured to receive a block input 202 that is a partial representation of the synthetic image being generated by the neural network, and to generate a block output 252 that is an updated representation of the synthetic image.

Each element of the block input 202 can represent a respective patch of the synthetic image being generated by the neural network. As depicted in FIG. 2A, the block output 252 can have a higher resolution than the block input 202. Each particular element of the block output 252 can also represent a respective patch of the synthetic image, e.g., the same patch or a portion of the patch that is represented by the element of the block input 202 from which the particular element was upsampled, as described below.

Although FIG. 2A depicts the block input 202 and block output 252 as being two-dimensional, generally the block input 202 and block output 252 can have any dimensionality, e.g., can be a sequence of elements as described above with reference to FIG. 1.

If the low-resolution network block 200 is the first network block in the sequence of network blocks, then the block input 202 can be the input to the neural network, e.g., the initial representation 112 described above with reference to FIG. 1. If the low-resolution network block 200 is not the first network block in the sequence of network blocks, then the block input 202 can be the block output generated by the preceding network block in the sequence.

The low-resolution network block 200 can include a cross-attention neural network layer 210, a first feedforward subnetwork 220, a multi-axis self-attention neural network layer 230, a second feedforward subnetwork 240, and an upsampling layer 250. In some implementations, one or more of these neural network layers and/or subnetworks depicted in FIG. 2A are not included in the low-resolution network block 200; for example, in some implementations the low-resolution network block 200 includes only one feedforward subnetwork. In some implementations, the low-resolution network block 200 also includes one or more other neural network layers and/or subnetworks in addition to those depicted in FIG. 2A. In some implementations, the neural network layers and subnetworks of the low-resolution network block 200 are in a different order than the order depicted in FIG. 2A.

The cross-attention neural network layer 210 is configured to apply a cross-attention mechanism between (i) the block input 202 and (ii) a latent embedding 204 that is an embedding of a latent code provided to the neural network as input. For example, the latent embedding 204 can be the input to the neural network, e.g., the initial representation 112 described above with reference to FIG. 1. As another example, the latent embedding 204 can be generated by the low-resolution network block 200 (or by the neural network generally, e.g., in implementations in which the latent embedding 204 is shared by multiple different network blocks) by processing the latent code using one or more neural network layers.

As described above with reference to FIG. 1, in some implementations, instead of or in addition to applying cross-attention between the block input 202 and the latent embedding 204, the low-resolution network block 200 can apply cross-attention between the block input 202 and a conditioning input to the neural network (or an embedding thereof) that characterizes desired qualities of the synthetic image.

The first feedforward subnetwork 220 is configured to process the output of the cross-attention neural network layer 210 using one or more element-wise feedforward neural network layers.

The multi-axis self-attention neural network layer 230 is configured to apply a multi-axis self-attention mechanism to the output of the first feedforward subnetwork 220. Multi-axis self-attention is described in more detail below with reference to FIG. 3. In some implementations, the operations of the multi-axis self-attention neural network layer 230 can be parallelized, as described in more detail below with reference to FIG. 3.

The second feedforward subnetwork 240 is configured to process the output of the multi-axis self-attention neural network layer 230 using one or more element-wise feedforward neural network layers.

In some implementations, the operations of the first feedforward subnetwork 220 and/or the second feedforward subnetwork 240 can be parallelized across multiple computing nodes, e.g., across multiple devices or across multiple threads of a parallel processing device. For example, the respective elements of the inputs to the subnetworks can be assigned to respective computing nodes to perform the element-wise feedforward operations.

The upsampling layer 250 is configured to upsample the output of the second feedforward subnetwork 240 to generate the block output 252. The upsampling layer 250 can perform any appropriate type of upsampling to generate the block output 252. For example, the upsampling layer 250 can perform nearest-neighbor upsampling or "pixel shuffle" upsampling. As a particular example, the upsampling layer 250 can upsample the output of the second feedforward subnetwork 240 by doubling the resolution in both a width dimension and a height dimension. In some implementations, the upsampling layer 250 further reduces the number of channels of the output of the second feedforward subnetwork 240, i.e., reduces the dimensionality of the output of the second feedforward subnetwork 240 in a depth dimension. As a particular example, the upsampling layer 250 can reduce the number of channels of the output of the second feedforward subnetwork 240 by half.

After generating the block output 252, the low-resolution network block 200 can provide the block output 252 to the subsequent network block in the sequence of network blocks of the neural network.

Figure 2B:
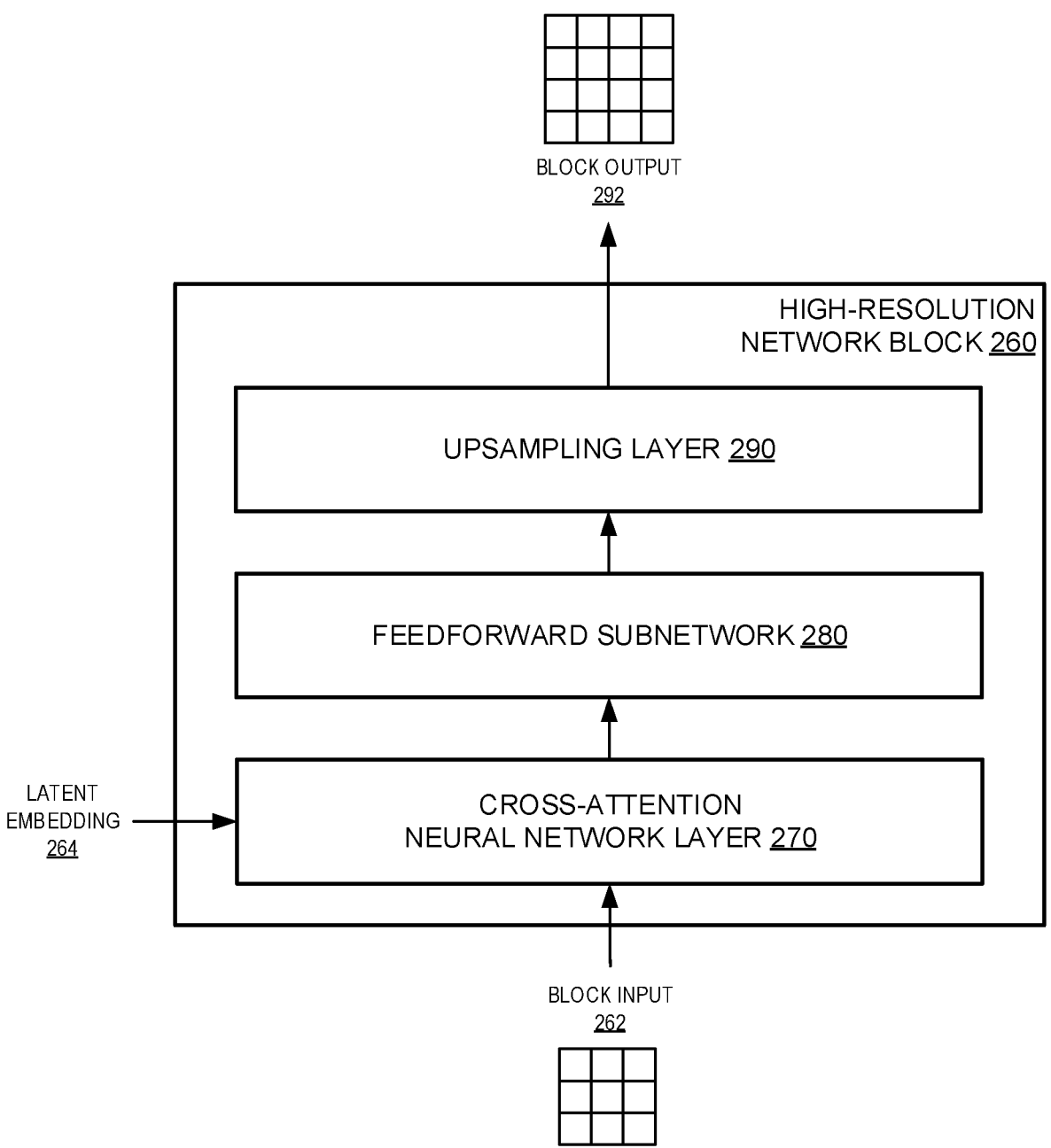
FIG. 2B is a diagram of an example high-resolution network block.

FIG. 2B is a diagram of an example high-resolution network block 260. The high-resolution network block 260 is an example of a system implemented as computer programs on one or more computers in one or more locations, in which the systems, components, and techniques described below can be implemented.

The high-resolution network block 260 can be one of a sequence of network blocks of a neural network configured to generate synthetic images. For example, the high-resolution network block 260 can be a component of the neural network 100 described above with reference to FIG. 1.

The high-resolution network block 260 is configured to receive a block input 262 that is a partial representation of the synthetic image being generated by the neural network, and to generate a block output 292 that is an updated representation of the synthetic image.

Each element of the block input 262 can represent a respective patch of the synthetic image being generated by the neural network. As depicted in FIG. 2B, the block output 292 can have a higher resolution than the block input 262. Each particular element of the block output 292 can also represent a respective patch of the synthetic image.

Although FIG. 2B depicts the block input 262 and block output 292 as being two-dimensional, generally the block input 262 and block output 292 can have any dimensionality, e.g., can be a sequence of elements as described above with reference to FIG. 1.

The block input 262 can be the block output generated by the preceding network block in the sequence of network blocks of the neural network.

The high-resolution network block 260 can include a cross-attention neural network layer 270, a feedforward subnetwork 280, and an upsampling layer 290. In some implementations, one or more of these neural network layers and/or subnetworks depicted in FIG. 2B are not included in the high-resolution network block 260. In some implementations, the high-resolution network block 260 also includes one or more other neural network layers and/or subnetworks in addition to those depicted in FIG. 2B. In some implementations, the neural network layers and subnetworks of the high-resolution network block 260 are in a different order than the order depicted in FIG. 2B.

The cross-attention neural network layer 270 is configured to apply a cross-attention mechanism between (i) the block input 262 and (ii) a latent embedding 264 that is an embedding of a latent code provided to the neural network as input. For example, the latent embedding 264 can be the input to the neural network, e.g., the initial representation 112 described above with reference to FIG. 1. As another example, the latent embedding 264 can be generated by the high-resolution network block 260 (or by the neural network generally, e.g., in implementations in which the latent embedding 264 is shared by multiple different network blocks) by processing the latent code using one or more neural network layers.

As described above with reference to FIG. 1, in some implementations, instead of or in addition to applying cross-attention between the block input 262 and the latent embedding 264, the high-resolution network block 260 can apply cross-attention between the block input 262 and a conditioning input to the neural network (or an embedding thereof) that characterizes desired qualities of the synthetic image.

The feedforward subnetwork 280 is configured to process the output of the cross-attention neural network layer 270 using one or more element-wise feedforward neural network layers. In some implementations, the operations of the feedforward subnetwork 280 can be parallelized across multiple computing nodes, e.g., by assigning respective elements of the input to the feedforward subnetwork 280 to respective computing nodes to perform the element-wise feedforward operations.

The upsampling layer 290 is configured to upsample the output of the feedforward subnetwork 280 to generate the block output 292. The upsampling layer 290 can perform any appropriate type of upsampling to generate the block output 292. For example, the upsampling layer 290 can perform nearest-neighbor upsampling or "pixel shuffle" upsampling. As a particular example, the upsampling layer 290 can upsample the output of the feedforward subnetwork 280 by doubling the resolution in both a width dimension and a height dimension. In some implementations, the upsampling layer 290 further reduces the number of channels of the output of the feedforward subnetwork 280, i.e., reduces the dimensionality of the output of the feedforward subnetwork 280 in a depth dimension. As a particular example, the upsampling layer 290 can reduce the number of channels of the output of the feedforward subnetwork 280 by half.

If the high-resolution network block 260 is the final network block in the sequence of network blocks, then the block output 292 can be the final representation of the synthetic image; that is, each element of the block output 292 can each include the final pixel values of the respective patch of the synthetic image represented by the element. If the high-resolution network block 260 is not the final network block in the sequence of network blocks, then the high-resolution network block 260 can provide the block output 292 to the subsequent network block in the sequence of network blocks of the neural network.

Thus, the high-resolution network block 260 can generate the block output 292 from the block input 262 without applying self-attention to the block input 262 or any intermediate representation thereof, thus improving the computational efficiency of the neural network.

Figure 3:
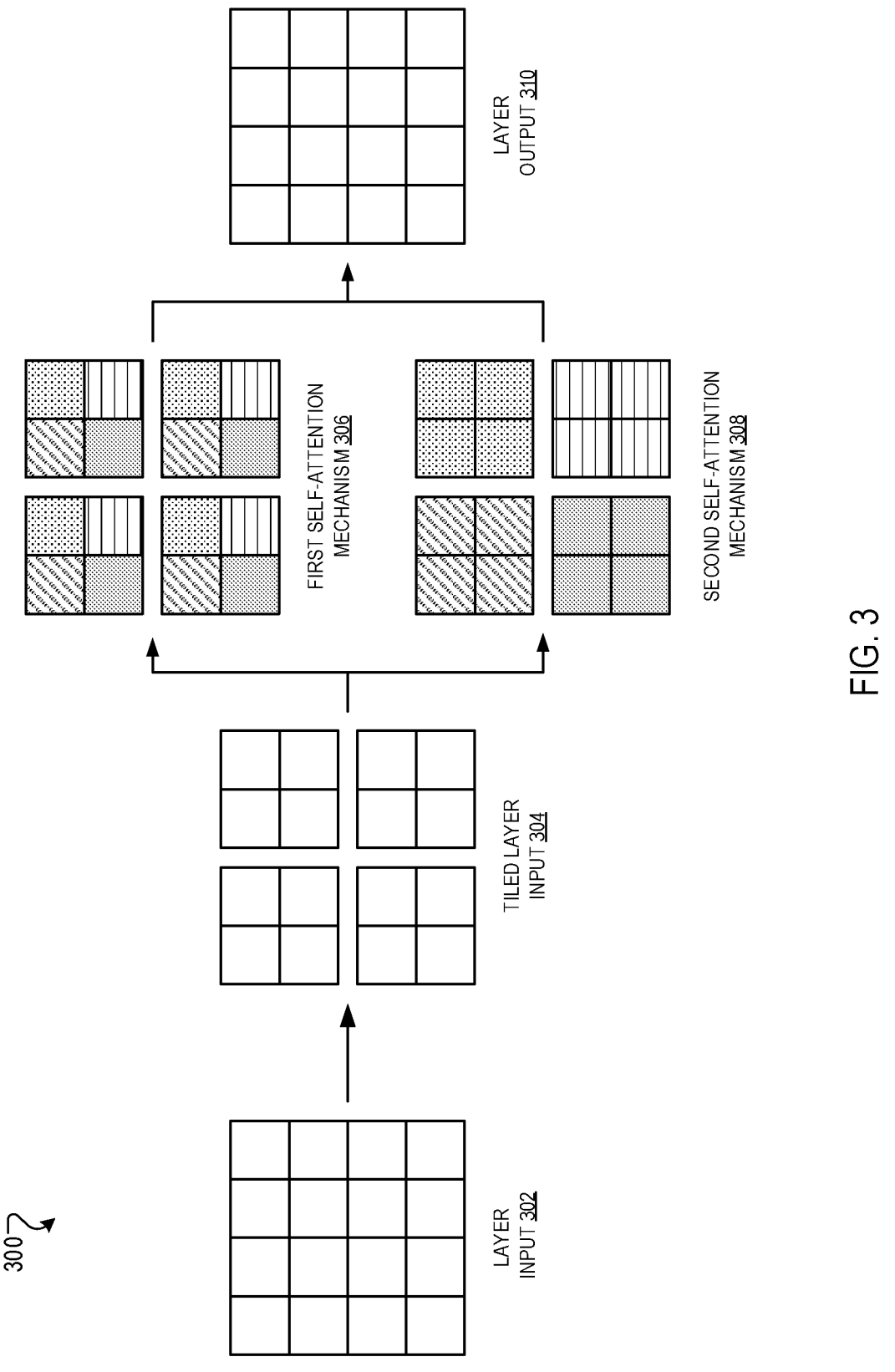
FIG. 3 illustrates an example multi-axis self-attention mechanism.

FIG. 3 illustrates an example multi-axis self-attention mechanism 300. For convenience, the multi-axis self-attention mechanism 300 will be described as being performed by a system of one or more computers located in one or more locations. For example, a neural network layer of a neural network can perform the multi-axis self-attention mechanism 300. As a particular example, one of the low-resolution network blocks 130*a-m* in the sequence 130 of low-resolution network blocks described above with reference to FIG. 1, can perform the multi-axis self-attention mechanism 300.

The system can receive a layer input 302 that includes multiple elements and perform the multi-axis self-attention mechanism 300 on the layer input 302 to generate a layer output 310 that includes updated versions of the elements of the layer input 302. That is, generally, the layer output 310 has the same size as the layer input 302, where each element in the layer output 310 corresponds to a particular element in the layer input 302.

In some implementations, the system receives the elements of the layer input 302 as a sequence, where the spatial relationships between the elements is implicitly encoded in the sequence or provided in data as another input (e.g., where the elements each represent a patch of a synthetic image being generated by the neural network), and the system constructs the layer input 302 from the sequence according to the spatial relationships.

The system can segment the layer input 302 into multiple tiles that each include a strict subset of the elements of the layer input 302, generating a tiled layer input 304. Each tile can include contiguous (i.e., neighboring) elements of the layer input 302. Generally, each element of the layer input 302 is only included in a single tile of the tiled layer input 304.

In some implementations, each tile of the tiled layer input 304 has the same size. In some other implementations, e.g., if the dimensionality of the layer input 302 is not divisible by the dimensionality of the tiles, then some of the tiles can have a different size, e.g., can include fewer elements (e.g., some of the tiles can include a number of elements that is the modulo between the dimensionality of the layer input 302 and the dimensionality of the other tiles).

For example, if the layer input 302 has dimensionality $L{\times}W{\times}C$, then the system can segment the layer input 302 into $n{\cdot}m$ tiles of size $L/m{\times}W/n{\times}C$. In the particular example depicted in FIG. 3, the layer input 302 has dimensionality $4{\times}4{\times}C$, and the system can segment the layer input 302 into 4 tiles of size $2{\times}2{\times}C$.

The system can then apply, for each of one or more dimensions of the tiled layer input 304, a respective self-attention mechanism to the elements of the tiled layer input 304 that are aligned in the dimension. That is, for each index of the dimension, the system can apply a self-attention mechanism to the elements of the tiled layer input 304 that occupy the index in the dimension.

Note that the tiled layer input 304 can be considered to have one additional dimension relative to the layer input 302. For example, while the elements of the layer input 302 can be identified by their index in two dimensions (e.g., a length index and a width index within the layer input 302), the elements of the tiled layer input 304 can be identified by their index in three dimensions (e.g., a tile index, and a length index and a width index within the tile).

A self-attention mechanism is an attention mechanism that is applied over each element in a set of elements to generate respective updated elements. For each particular element, the system can apply the self-attention mechanism by: generating a query from the particular element (e.g., by processing the particular element using a trained neural network layer); for each element in the set, generating a respective key (e.g., by processing the element using a trained neural network layer) and a respective value (e.g., by processing the element using a trained neural network layer); and mapping the query, keys, and values to generate the updated element for the particular element, e.g., by: combining, for each element in the set, the query of the particular element with the key to generate a respective weight; and determining a weighted sum of the values for the element where each value is weighted by the weight generated from the corresponding key.

In some implementations, each of one or more of the self-attention mechanisms are multi-headed self-attention mechanisms, where the self-attention mechanism is applied multiple times to generate respective initial attention outputs, and the initial attention outputs are combined to generate a final attention output, e.g., by determining a sum of the initial attention outputs.

Self-attention mechanisms and multi-headed self-attention are discussed in more detail in "Attention is All You Need," Vaswani et al., arXiv: 1706.03762.

For example, the system can apply a first self-attention mechanism 306. In the first self-attention mechanism 306, the system applies self-attention, for each particular position within a tile, to the elements that occupy the particular position in their respective tiles. This can be considered applying, for each particular index in a dimension that encodes both a length index and a width index within the tiles, a self-attention mechanism to elements in the tiled layer input 304 that have the particular index.

As depicted in FIG. 3, the system can perform the first self-attention mechanism 306 by applying self-attention to elements that have the same hatching pattern, i.e., applying self-attention to each element in the first position of their respective tiles, applying self-attention to each element in the second position of their respective tiles, applying self-attention to each element in the third position of their respective tiles, and applying self-attention to each element in the fourth position of their respective tiles.

The output of the first self-attention mechanism 306 is a respective updated representation for each tile (i.e., a respective updated representation for each element in each tile).

Instead or in addition, the system can apply a second self-attention mechanism 308. In the second self-attention mechanism 308, the system applies self-attention, for each particular tile, to the elements that are in the particular tile. This can be considered applying, for each particular tile index identifying a particular tile of the tiled layer input 304, a self-attention mechanism to elements in the tiled layer input 304 that have the particular tile index.

Again, as depicted in FIG. 3, the system can perform the second self-attention mechanism 308 by applying self-attention to elements that have the same hatching pattern, i.e., applying self-attention to each element in the first tile, applying self-attention to each element in the second tile, applying self-attention to each element in the third tile, and applying self-attention to each element in the fourth tile.

The output of the second self-attention mechanism 308 is a respective updated representation for each tile (i.e., a respective updated representation for each element in each tile).

In some implementations, the system further segments the channel dimension when generating the tiles of the tiled layer input 304. That is, if the layer input 302 has dimensionality L×W×C, then the system can segment the layer input 302 into n·m·p tiles of size L/m×W/n×C/p. In the particular example depicted in FIG. 3, the layer input 302 has dimensionality 4×4×C, and the system can segment the layer input 302 into 4 tiles of size 2×2×C/2, i.e., where the tiled layer input 304 has a depth of two tiles.

In these implementations, the system can provide tiles having respective different indices in the channel dimension to respective different attention mechanisms 306 and 308. For example, the system can apply the first self-attention mechanism 306, as described above, to a first set of 2×2×C/2 tiles that have a first index (i.e., "depth") in the channel dimension, and the second self-attention mechanism 308, as described above, to a second set of 2×2×C/2 tiles that have a second depth in the channel dimension. In this example, the output of both the first self-attention mechanism 306 and the second self-attention mechanism 308 are updated representations of the respective 2×2×C/2 tiles.

In other words, in some implementations each element is provided to all self-attention mechanisms in the multi-axis self-attention mechanism 300, i.e., to both the first self-attention mechanism 306 and the second self-attention mechanism 308 (e.g., in the implementation described above in which the tiles have size 2×2×C). In some other implementations, each element is provided only to a single self-attention mechanisms in the multi-axis self-attention mechanism 300, i.e., to either the first self-attention mechanism 306 or the second self-attention mechanism 308 (e.g., in the implementation described above in which the tiles have size 2×2×C/2).

Put yet another way, the system can provide a first subset of the tiles to the first self-attention mechanism 306 and a second subset of the tiles (e.g., all tiles not in the first subset) to the second self-attention mechanism 308.

The system can combine the respective outputs of the first self-attention mechanism 306 and the second self-attention mechanism 308 to generate the layer output 310. For example, if each element was provided to all self-attention mechanisms in the multi-axis self-attention mechanism 300, such that the respective outputs of the first self-attention mechanism 306 and the second self-attention mechanism 308 have depth C, then the system can determine, for each element, a sum or average of (i) the updated representation for the element generated by the first self-attention mechanism 306 and (ii) the updated representation for the element generated by the second self-attention mechanism 308, to generate the corresponding element in the layer output 310. Thus, the dimensionality of the layer output 310 can be the same as the dimensionality of the layer input 302.

As another example, if each element was provided to only a single self-attention mechanism in the multi-axis self-attention mechanism 300, then the system can determine the updated represented for the element generated by the respective self-attention mechanism 306 or 208 to be the corresponding element in the layer output 310. Equivalently, the system can concatenate the outputs of the first self-attention mechanism 306 and the second self-attention mechanism 308 (e.g., ensuring the depth relationships of the elements is the same in the layer output 310 as the layer input 302) to generate the layer output 310. Thus, again, the dimensionality of the layer output 310 can be the same as the dimensionality of the layer input 302.

In some implementations, the operations of the multi-axis self-attention mechanism 300 are parallelized across multiple computing nodes, e.g., across multiple devices, across multiple cores of a multi-core device, and/or across multiple threads of a parallel processing device. For each, the operations of the first self-attention mechanism 306 can be assigned to a first set of one or more computing nodes, and the operations of the second self-attention mechanism 308 can be assigned to a second set of one or more computing nodes. That is, the system can send the tiled layer input 304 (or a portion thereof, as described above) to the first set of computing nodes to execute the first self-attention mechanism 306, and can send the tiled layer input 304 (or a portion thereof, as described above) to the second set of computing nodes to execute the second self-attention mechanism 308. The first and second sets of computing nodes can then execute in parallel. The system can then obtain the output of the first attention mechanism 306 from the first set of computing nodes and the output of the second attention mechanism 308 from the second set of computing nodes, and combine the respective outputs to generate the final layer output 310, as described above.

FIG. 4 is a flow diagram of an example process for generating a synthetic image. For convenience, the process 400 will be described as being performed by a system of one or more computers located in one or more locations. For example, a neural network, e.g., the neural network 100 described above with reference to in FIG. 1, appropriately programmed in accordance with this specification, can perform the process 400.

It will be understood that the image generated by the neural network is based at least in part on training images used to train the neural network. The neural network may be configured for unconditional image generation (in which case the neural network is configured to generate images that are "unconditioned"), or conditional image generation (in which case the neural network is configured to generate images that are conditioned). It will be understood that in unconditional image generation, the neural network is configured (e.g. trained) to generate images from a distribution defined by a set of images on which the neural network was trained. In conditional image generation, the neural network may alternatively, or in addition, be configured (e.g. trained) to generate images conditional on a conditioning input.

The system can generate the synthetic image by executing a neural network that includes a sequence of one or more first network blocks followed by a sequence of one or more second network blocks.

The system can perform steps 402-406 for each first network block in the sequence of first network blocks.

The system obtains a first block input to the first network block, the first block input including multiple first elements (step 402).

The system applies a self-attention mechanism over at least a subset of the first elements of the first block input to generate an updated first block input (step 404).

The system upsamples the updated first block input to generate a first block output for the first network block (step 406).

The system can perform steps 408-412 for each second network block in the sequence of second network blocks.

The system obtains a second block input to the second network block (step 408).

The system processes the second block input using one or more neural network layers to generate an updated second block input (step 410).

The system upsamples the updated second block input to generate a second block output (step 412).

In some implementations, none of the second network blocks perform a self-attention mechanism.

The second block output of the final second network block in the sequence can be the final synthetic image.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a data communication network.

In this specification, the term "database" is used broadly to refer to any collection of data: the data does not need to be structured in any particular way, or structured at all, and it can be stored on storage devices in one or more locations. Thus, for example, the index database can include multiple collections of data, each of which may be organized and accessed differently.

Similarly, in this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework, a Microsoft Cognitive Toolkit framework, an Apache Singa framework, or an Apache MXNet framework.

Embodiments of the subject matter described in this specification can be implemented in a computing system that includes a back end component, e.g., as a data server, or that includes a middleware component, e.g., an application server, or that includes a front end component, e.g., a client computer having a graphical user interface, a web browser, or an app through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

In addition to the embodiments described above, the following embodiments are also innovative:

Embodiment 1 is a system comprising one or more computers and one or more storage devices storing instructions that when executed by the one or more computers cause the one or more computers to implement a neural network configured to generate images, the neural network comprising a sequence of one or more first network blocks followed by a sequence of one or more second network blocks, wherein:

each first network block is configured to perform operations comprising:

obtaining a first block input comprising a plurality of first elements;

applying a self-attention mechanism over at least a subset of the first elements of the first block input to generate an updated first block input; and upsampling the updated first block input to generate a first block output; and each second network block is configured to perform operations comprising:

obtaining a second block input comprising a plurality of second elements;

processing the second block input using one or more neural network layers to generate an updated second block input; and upsampling the updated second block input to generate a second block output.

Embodiment 2 is the system of embodiment 1, wherein, for each second network block, the second network block does not apply a self-attention mechanism over any second elements of the second block input.

Embodiment 3 is the system of embodiment 2. wherein the first network blocks and the second network blocks have a same architecture except for the self-attention mechanism of the first network blocks.

Embodiment 4 is the system of any one of embodiments 1-3, wherein applying a self-attention mechanism over at least a subset of the first elements of the first block input comprises applying a multi-axis self-attention mechanism, comprising:

applying a first self-attention mechanism to a first subset of the first elements along a first axis of the first block input; and applying a second self-attention mechanisms to a second subset of the first elements along a second axis of the first block input.

Embodiment 5 is the system of embodiment 4, wherein applying the multi-axis self-attention mechanism further comprises:

segmenting the first block input into a plurality of first tiles and a plurality of second tiles, wherein:

each tile comprises a plurality of first elements of the first block input, and each second tile of the plurality of second tiles comprises a same set of positions;

for each first tile of the plurality of first tiles, applying the first self-attention mechanism over the plurality of first elements of the first tile; and for each position in the set of positions, applying the second self-attention mechanism over each first element having the position in a respective second tile of the plurality of second tiles.

Embodiment 6 is the system of embodiment 5, wherein segmenting the first block input into a plurality of first tiles and a plurality of second tiles comprises:

segmenting the first block input into a plurality of initial tiles; and for each initial tile of the plurality of initial tiles:

determining a first subtile of the initial tile to be a first tile of the plurality of first tiles, and determining a second subtile of the initial tile to be a second tile of the plurality of second tiles.

Embodiment 7 is the system of any one of embodiments 1-6, wherein each first network block in the sequence of first network blocks comprises a cross-attention neural network layer that performs cross attention between (i) the first block input of the first network block and (ii) an initial network input of the neural network.

Embodiment 8 is the system of any one of embodiments 1-7, wherein each second network block in the sequence of second network blocks comprises a cross-attention neural network layer that performs cross attention between (i) the second block input of the second network block and (ii) an initial network input of the neural network.

Embodiment 9 is the system of any one of embodiments 7 or 8, wherein the initial network input comprises a randomly sampled tensor with positional embeddings.

Embodiment 10 is the system of embodiment 9, wherein the positional embeddings are machine-learned.

Embodiment 11 is the system of any one of embodiments 1-10, wherein:

each first network block comprises an upsampling layer such that, for each first network block, the first block output of the first network block is larger in at least one dimension than the first block output of the previous first network block in the sequence of first network blocks.

Embodiment 12 is the system of any one of embodiments 1-11, wherein:

each second network block comprises an upsampling layer such that, for each second network block, the second block output of the second network block is larger in at least one dimension than the second block output of the previous second network block in the sequence of second network blocks.

Embodiment 13 is the system of any one of embodiments 1-12, wherein the second block output of a final second network block in the sequence of second network blocks is the image generated by the neural network.

Embodiment 14 is the system of any one of embodiments 1-13, wherein:

the first block input for an initial first network block in the sequence of first network blocks is generated from a network input of the neural network;

the first block input for each first network block in the sequence of first network blocks except for the initial first network block is the first block output of the previous first network block in the sequence of first network blocks;

the second block input for an initial second network block in the sequence of second network blocks is the first block output of a final first network block in the sequence of first network blocks;

the second block input for each second network block in the sequence of second network blocks except for the initial second network block is the second block output of the previous second network block in the sequence of second network blocks; and the second block output of a final second network block in the sequence of second network blocks is the image generated by the neural network.

Embodiment 15 is a method comprising:

obtaining a network input; and generating an output image by processing the network input using the neural network of the system of any one of embodiments 1-14.

Embodiment 16 is one or more computer storage media storing instructions that when executed by one or more computers cause the one more computers to implement the neural network of the system of any one of embodiments 1-14.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A system comprising one or more computers and one or more storage devices storing instructions that when executed by the one or more computers cause the one or more computers to implement a neural network configured to generate images, the neural network comprising a sequence of one or more first network blocks followed by a sequence of one or more second network blocks, wherein:

each first network block is configured to perform operations comprising:

obtaining a first block input comprising a plurality of first elements;

applying a self-attention mechanism over at least a subset of the first elements of the first block input to generate an updated first block input; and upsampling the updated first block input to generate a first block output; and each second network block is configured to perform operations comprising:

obtaining a second block input comprising a plurality of second elements;

processing the second block input using one or more neural network layers to generate an updated second block input; and upsampling the updated second block input to generate a second block output, wherein:

the first block input for an initial first network block in the sequence of first network blocks is generated from a network input of the neural network;

the first block input for each first network block in the sequence of first network blocks except for the initial first network block is the first block output of the previous first network block in the sequence of first network blocks;

the second block input for an initial second network block in the sequence of second network blocks is the first block output of a final first network block in the sequence of first network blocks;

the second block input for each second network block in the sequence of second network blocks except for the initial second network block is the second block output of the previous second network block in the sequence of second network blocks; and the second block output of a final second network block in the sequence of second network blocks is the image generated by the neural network.

2. The system of claim 1, wherein, for each second network block, the second network block does not apply a self-attention mechanism over any second elements of the second block input.

3. The system of claim 2, wherein the first network blocks and the second network blocks have a same architecture except for the self-attention mechanism of the first network blocks.

4. The system of claim 1, wherein applying a self-attention mechanism over at least a subset of the first elements of the first block input comprises applying a multi-axis self-attention mechanism, comprising:

applying a first self-attention mechanism to a first subset of the first elements along a first axis of the first block input; and applying a second self-attention mechanisms to a second subset of the first elements along a second axis of the first block input.

5. The system of claim 4, wherein applying the multi-axis self-attention mechanism further comprises:

segmenting the first block input into a plurality of first tiles and a plurality of second tiles, wherein:

each tile comprises a plurality of first elements of the first block input, and each second tile of the plurality of second tiles comprises a same set of positions;

for each first tile of the plurality of first tiles, applying the first self-attention mechanism over the plurality of first elements of the first tile; and for each position in the set of positions, applying the second self-attention mechanism over each first element having the position in a respective second tile of the plurality of second tiles.

6. The system of claim 5, wherein segmenting the first block input into a plurality of first tiles and a plurality of second tiles comprises:

segmenting the first block input into a plurality of initial tiles; and for each initial tile of the plurality of initial tiles:

determining a first subtile of the initial tile to be a first tile of the plurality of first tiles, and determining a second subtile of the initial tile to be a second tile of the plurality of second tiles.

7. The system of claim 1, wherein each first network block in the sequence of first network blocks comprises a cross-attention neural network layer that performs cross attention between (i) the first block input of the first network block and (ii) an initial network input of the neural network.

8. The system of claim 1, wherein each second network block in the sequence of second network blocks comprises a cross-attention neural network layer that performs cross attention between (i) the second block input of the second network block and (ii) an initial network input of the neural network.

9. The system of claim 7, wherein the initial network input comprises a randomly sampled tensor with positional embeddings.

10. The system of claim 9, wherein the positional embeddings are machine-learned.

11. The system of claim 1, wherein:

each first network block comprises an upsampling layer such that, for each first network block, the first block output of the first network block is larger in at least one dimension than the first block output of the previous first network block in the sequence of first network blocks.

12. The system of claim 1, wherein:

each second network block comprises an upsampling layer such that, for each second network block, the second block output of the second network block is larger in at least one dimension than the second block output of the previous second network block in the sequence of second network blocks.

13. The system of claim 1, wherein the second block output of a final second network block in the sequence of second network blocks is the image generated by the neural network.

14. A method comprising:

obtaining a network input; and generating an output image by processing the network input using a neural network, the neural network comprising a sequence of one or more first network blocks followed by a sequence of one or more second network blocks, wherein:

each first network block is configured to perform operations comprising:

obtaining a first block input comprising a plurality of first elements;

applying a self-attention mechanism over at least a subset of the first elements of the first block input to generate an updated first block input; and upsampling the updated first block input to generate a first block output; and each second network block is configured to perform operations comprising:

obtaining a second block input comprising a plurality of second elements;

processing the second block input using one or more neural network layers to generate an updated second block input; and upsampling the updated second block input to generate a second block output, wherein:

the first block input for an initial first network block in the sequence of first network blocks is generated from a network input of the neural network;

the first block input for each first network block in the sequence of first network blocks except for the initial first network block is the first block output of the previous first network block in the sequence of first network blocks;

the second block input for an initial second network block in the sequence of second network blocks is the first block output of a final first network block in the sequence of first network blocks;

the second block input for each second network block in the sequence of second network blocks except for the initial second network block is the second block output of the previous second network block in the sequence of second network blocks; and the second block output of a final second network block in the sequence of second network blocks is the image generated by the neural network.

15. The method of claim 14, wherein, for each second network block, the second network block does not apply a self-attention mechanism over any second elements of the second block input.

16. The method of claim 15, wherein the first network blocks and the second network blocks have a same architecture except for the self-attention mechanism of the first network blocks.

17. The method of claim 14, wherein applying a self-attention mechanism over at least a subset of the first elements of the first block input comprises applying a multi-axis self-attention mechanism, comprising:

applying a first self-attention mechanism to a first subset of the first elements along a first axis of the first block input; and applying a second self-attention mechanisms to a second subset of the first elements along a second axis of the first block input.

18. The method of claim 17, wherein applying the multi-axis self-attention mechanism further comprises:

segmenting the first block input into a plurality of first tiles and a plurality of second tiles, wherein:

each tile comprises a plurality of first elements of the first block input, and each second tile of the plurality of second tiles comprises a same set of positions;

for each first tile of the plurality of first tiles, applying the first self-attention mechanism over the plurality of first elements of the first tile; and for each position in the set of positions, applying the second self-attention mechanism over each first element having the position in a respective second tile of the plurality of second tiles.

19. The method of claim 14, wherein, for each second network block, the second network block does not apply a self-attention mechanism over any second elements of the second block input.

20. One or more non-transitory computer-readable storage media storing instructions that when executed by one or more computers cause the one or more computers to implement a neural network configured to generate images, the neural network comprising a sequence of one or more first network blocks followed by a sequence of one or more second network blocks, wherein:

each first network block is configured to perform operations comprising:

obtaining a first block input comprising a plurality of first elements;

applying a self-attention mechanism over at least a subset of the first elements of the first block input to generate an updated first block input; and upsampling the updated first block input to generate a first block output; and each second network block is configured to perform operations comprising:

obtaining a second block input comprising a plurality of second elements;

processing the second block input using one or more neural network layers to generate an updated second block input; and upsampling the updated second block input to generate a second block output, wherein:

the first block input for an initial first network block in the sequence of first network blocks is generated from a network input of the neural network;

the first block input for each first network block in the sequence of first network blocks except for the initial first network block is the first block output of the previous first network block in the sequence of first network blocks;

the second block input for an initial second network block in the sequence of second network blocks is the first block output of a final first network block in the sequence of first network blocks;

the second block input for each second network block in the sequence of second network blocks except for the initial second network block is the second block output of the previous second network block in the sequence of second network blocks; and the second block output of a final second network block in the sequence of second network blocks is the image generated by the neural network.

* * * * *